Figure 1:
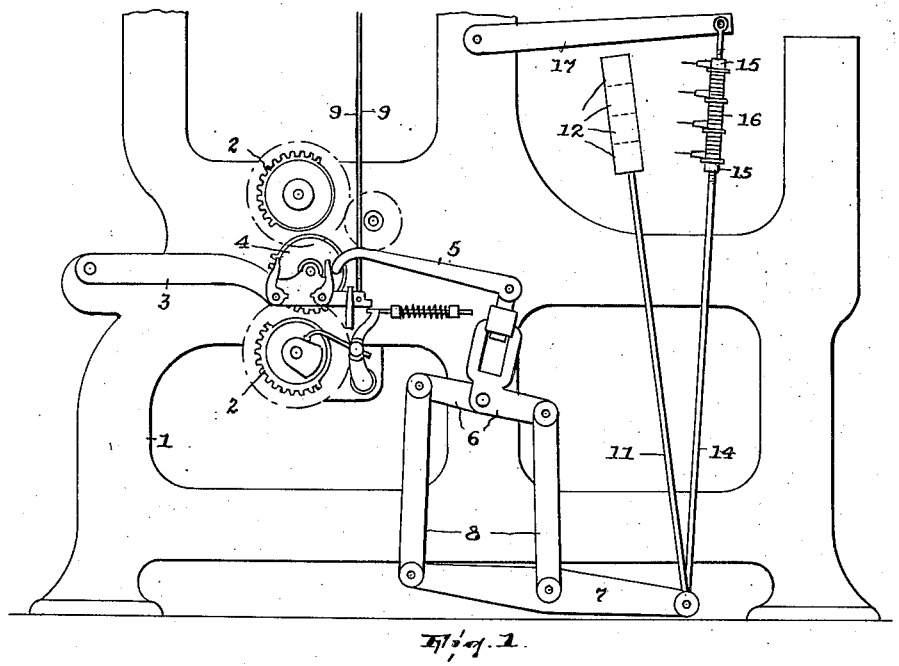

Nov. 1, 1938.  W. PRICE  2,134,953

BOX LOOM

Filed Oct. 26, 1937

INVENTOR,
Walter Price,
BY
John E. Seward
ATTORNEY.

Patented Nov. 1, 1938

2,134,953

UNITED STATES PATENT OFFICE 2,134,953

BOX LOOM

Walter Price, Ridgewood, N. J.

Application October 26, 1937, Serial No. 171,038

3 Claims. (Cl. 139—233)

This invention is concerned with the problem of detecting the failure of filling or weft as to any shuttle in a box-loom and of effecting the detection in such a way that only the feeler or contact pair corresponding to the box which is next to aline its shuttle with the lay will be put in circuit.

To this end I employ in the example herein set forth an electric circuit including, with a main line and therein a source of energy and an electro-magnetic device which may serve in any way to indicate detection (as by stopping the loom), two pairs of extension lines of which those of one pair are connectible with the main line at the positive side, and those of the other pair are connectible with the main line at the negative side, of said source, and a pair of branch lines extending from each extension line, said branch lines respectively providing terminals and those terminals at the positive side being paired with those at the negative side of said source and thereby forming four pairs of feeler contacts, in combination with a pair of circuit-closers one of which is movable to connect with the main line either extension line of one pair of such lines independently of the other and the other of which is movable to connect with the main line either extension line of the other pair of such lines independently of the other.

In a well known type of box motion there are two systems each movable independently of the other to two different positions and determining, according to the four possible relations of these systems to each other, which particular box is to be brought into alinement with the lay. The mentioned circuit-closers may be parts, respectively, of said systems.

According to the invention the feelers, arranged superposed and opposite the respective boxes, are parts of what I term the detector which is connected to move up and down with the box structure but is held in a novel way from moving back and forth therewith as it reciprocates with the lay.

Figure 2:
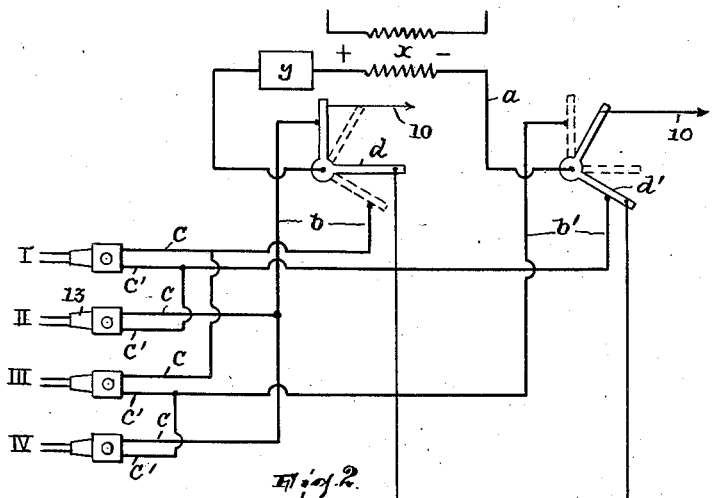

In the drawing,

Fig. 1 is a side elevation of a box-loom, showing parts of the mentioned system which will include elements that may serve as the aforesaid circuit-closers; and Fig. 2 is a diagram showing the electric circuit and the circuit-closers.

In Fig. 2 let $a$ be the main line of the circuit, containing the secondary of a transformer $x$, or other energy source, and some electro-magnetic device $y$ which will serve to indicate detection of weft failure as to any shuttle, as by stopping the loom or effecting another change in the operation thereof.

$b$ $b'$ are the two pairs of extension lines of which those of the pair $b$ are here taken to be connectible with the main line at the positive side, and those of the pair $b'$ are here taken as connectible with the main line at the negative side, of the source $x$.

Each of the four extension lines $b$ $b'$ is branched, there being eight in all; those branch lines which are positive or extend from the extension lines $b$ are designated $c$ and those which are negative or extend from the extension lines $b'$ are designated $c'$. The branch lines $c$ and $c'$ are paired, as shown, thereby forming four pairs of contacts, here designated I, II, III and IV.

$d$ $d'$ are two circuit-closers connected electrically with the respective ends of the main line $a$. Circuit closer $d$ is movable to connect either extension line $b$ independently of the other with the main line $a$, and circuit closer $d'$ is movable to connect either extension line $b'$ independently of the other with the main line $a$.

Four relative positions of the two circuit-closers in which they establish connection between the main line and either of the extension lines $b$ on the one hand and either of the extension lines $b'$ on the other are possible, to wit, when both have been moved clockwise, or both have been moved anti-clockwise, or one moved clockwise and the other anti-clockwise, or vice-versa.

When the circuit-closers are in any one of these four relative positions one pair of contacts will be in circuit and all the others out. Thus, in the example the contact pair II is in circuit and the pairs I, III and IV are out, the circuit being via the main line $a$, circuit-closer $d$, left-hand extension line $b$ and its branch $c$ which terminates at contact pair II, the branch $c'$ leading from such contact pair to the extension line $b'$ terminating at the right of circuit-closer $d'$, such extension line, and such circuit-closer; and all the other contact pairs I, III and IV are out of circuit because the latter is open at the right and left of circuit-closers $d$ and $d'$, respectively.

The contact pairs should be respectively coordinated with the several boxes of the loom, for instance, so that the pairs I, II, III and IV respectively serve the first, second, third and fourth box (reading downward) and the circuit may be made to be closed (so far as circuit-closers $d$ and $d'$ are concerned) from any pattern means. In the example this is accomplished by using as the circuit-closers elements of two systems forming parts of the box motion. Thus:

In Fig. 1 a box-motion of well-known type is shown (see, for instance, Patent No. 1,554,297). On the loom frame 1 are two mutilated driving gears 2 constantly rotated reversely to each other. 3 is a pair of levers respectively having journaled therein mutilated driven gears 4 with which are respectively connected by links 5 bell-crank levers 6, in turn respectively connected to different points in the length of a box-lever 7 by links 8. (One of each of the parts 3, 4 and 5 does not appear because hidden by the other such part.) The mentioned systems (which I term controlling systems) respectively include with levers, which may be the circuit-closers $d$ $d'$, connections 9 between such levers and the respective levers 3. Levers $d$ $d'$ will be respectively connected with two hooks of a jacquard machine by cords 10. According as either or both levers are made to rise or permitted to fall by the jacquard hooks so the box motion is put into action to bring a particular box into line with the lay and the contact pair corresponding to that box put in circuit.

The box lever 7 forms a support for and has pivoted thereto the rod 11 of the box structure which includes four superposed boxes 12 and is confined in the usual way to the lay (not shown) so as to move back and forth therewith.

Each contact pair is made a part of a feeler, to wit, by being embodied in insulation 13, and these feelers are strung on a rod 14 which upstands from and is pivoted to the box lever so that the detector formed by the rod and feelers will rise and fall in unison with the box structure. The feelers are clamped on the rod between two nuts 15 screwed thereon, and there may be spacing washers 16 between them, they thus being adjustable up and down and from each other so as to bring each into properly opposed relation to the corresponding box.

The detector, though movable up and down with the box structure, does not partake of its forward and back movement, it being confined against such movement by a link 17 connecting it with the frame 1.

Each shuttle of the loom is of course in the usual way to receive against its wound weft package the impact of the corresponding feeler, for which purpose the shuttle will as usual have an opening to admit the feeler. The quill or core of its weft package will also, as usual, have a metal or other circuit-closing portion which is normally covered by the weft but is adapted to be contacted by the feeler when the weft is exhausted, or substantially so.

If the weft of any shuttle fails then there will be a complete closing of the circuit with actuation of device $y$ on the ensuing forward movement of the box structure only with respect to that shuttle which is to be newly brought into or is to continue in line with the lay, and if also its weft core is bared. In other words, at no time is the circuit closed by circuit-closers $d$ $d'$ with respect to three of the feelers, and when they close the circuit with respect to the fourth feeler there must be weft-failure in the corresponding shuttle for complete closing of the circuit.

Since the circuit-closers $d$ $d'$ are parts of the mentioned systems which determine the position of the box structure on each cycle of the loom they close the circuit with respect to the box whose shuttle is newly to be or is to remain in alinement with the lay before the feeling action occurs, with consequent actuation of device $y$ if the weft-core of that shuttle is bared.

And in any event the closing of the circuit is always completed before the time when the change of position of the box-structure would be completed and the shuttle then to stand alined with the lay is discharged from its box. This is an incident of utilizing the mentioned systems (which determine the position to which the box-structure-moving means 4—5—6—7—8 is movable to position the box-structure) as means for preliminarily closing the circuit, as by $d$ $d'$.

In another aspect of the invention the said systems constitute means arbitrarily movable to close the circuit with respect to the terminals of any selected feeler pair independently of the remainder.

As usual, there will be associated with the box structure shown another box structure at the far end of the lay, arranged to rise and fall in some way, not material here, in unison with the box structure shown and for receiving the shuttles at said far end. In this connection, and where device $y$ acts to stop the loom, I note the following advantage of my invention:

Since only the shuttle of that box which is to be in line with the lay when the latter beats up can be effective to stop the loom (due to weft failure) then when the stopping occurs such shuttle will be left alined with the lay and so easily removable from its box, to wit, the box at the far side of the lay into which it was shot as the lay moved back following the detection, thus making it unnecessary to shift the box structure for effecting such removal.

The term "failure" is herein used to mean any lack of weft sufficient at least to permit the circuit to be closed at the corresponding feeler.

Having thus fully described my invention what I claim is:

1. In a weft-failure detecting means for a box-loom, an electric circuit including, with a main line and therein a source of energy and an electro-magnetic detection-indicating device, two pairs of extension lines of which those of one pair are connectible with the main line at the positive side, and those of the other pair are connectible with the main line at the negative side, of said source, and a pair of branch lines extending from each extension line, said branch lines respectively providing terminals and those terminals at the positive side being paired with those at the negative side of said source and thereby forming four pairs of feeler contacts, in combination with a pair of circuit-closers one of which is movable to connect with the main line either independently of the other line of one pair of extension lines and the other of which is movable to connect with the main line either independently of the other line of the other pair of extension lines.

2. In combination, with the controlling system of a box-motion of the class described, said system being movable to four different relative positions to determine the position of a four-box structure movable by said box-motion, an electric circuit including, with a main line and therein a source of energy and an electro-magnetic detection-indicating device, two pairs of extension lines of which those of one pair are connectible with the main line at the positive side, and those of the other pair are connectible with the main line at the negative side, of said source, and a pair of branch lines extending from each extension line, said branch lines respectively providing terminals and those terminals at the positive side being paired with those at the negative side of said source and thereby forming four pairs of feeler contacts, one system being movable and thereupon adapted electrically to connect with the main line either independently of the other line of one pair of extension lines and the other system being movable and thereupon adapted electrically to connect with the main line either independently of the other line of the other pair of extension lines.

3. A box-loom including a structure having superposed shuttle boxes, a structure having superposed feelers respectively opposed to the boxes and contactible with the bared weft cores or shuttles respectively occupying the boxes, means movable to either of two different given positions to position in unison the two structures at either of two given elevations, circuit-closing means movable to determine the position to which the first means is so movable, means to move the first means to the position so determined, and means for indicating failure of weft including a circuit to be closed by the second-named means when moved and having branches respectively including the feelers, each feeler affording a break in the corresponding branch closable by the corresponding weft core on contact of such feeler with the said weft core.

WALTER PRICE.